United States Patent
Fu et al.

(10) Patent No.: US 8,846,798 B2
(45) Date of Patent: Sep. 30, 2014

(54) POST-TREATMENT SOLUTION FOR DIGITAL INKJET PRINTING

(71) Applicant: Hewlett-Packard Development Company, L.P., Fort Collins, CO (US)

(72) Inventors: Xulong Fu, San Diego, CA (US); Lokendra Pal, San Diego, CA (US); Xiaoqi Zhou, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/679,197

(22) Filed: Nov. 16, 2012

(65) Prior Publication Data

US 2014/0141212 A1     May 22, 2014

(51) Int. Cl.
*C09D 191/06* (2006.01)
*B41J 11/00* (2006.01)
*C09D 123/12* (2006.01)
*B41M 7/00* (2006.01)

(52) U.S. Cl.
CPC ............ *C09D 191/06* (2013.01); *B41J 11/0015* (2013.01); *C09D 123/12* (2013.01); *B41M 7/0027* (2013.01); *B41J 11/002* (2013.01); *B41M 7/0018* (2013.01); *B41M 7/009* (2013.01); *B41M 7/0036* (2013.01)
USPC ........... 524/487; 524/557; 524/503; 428/203; 428/205; 347/102; 347/17

(58) Field of Classification Search
USPC ................. 524/487, 557, 503; 428/205, 203; 347/102, 17
See application file for complete search history.

(56) References Cited

U.S. PATENT DOCUMENTS

| | | | |
|---|---|---|---|
| 5,837,406 A | 11/1998 | Tavernier et al. | |
| 5,889,083 A * | 3/1999 | Zhu | 523/161 |
| 5,905,006 A | 5/1999 | Tavernier et al. | |
| 6,203,959 B1 | 3/2001 | Tanikawa et al. | |
| 6,655,796 B2 | 12/2003 | Sharma | |
| 7,662,868 B2 | 2/2010 | Nakamura | |
| 2001/0021733 A1* | 9/2001 | Peltonen et al. | 524/47 |
| 2004/0249018 A1* | 12/2004 | Kataoka et al. | 523/160 |
| 2008/0188599 A1* | 8/2008 | Dinescu et al. | 524/169 |

FOREIGN PATENT DOCUMENTS

EP    0801333    10/1997

OTHER PUBLICATIONS

"Effects of Post-Processing Treatments on the Image Stability of Color Prints", Technical Data/Reference, Kodak Publication No. E-176, Feb. 2004, 6 pages.

\* cited by examiner

*Primary Examiner* — Deve E Valdez

(57) ABSTRACT

A post-treatment solution for digital inkjet printing includes a thermoplastic material having a melting temperature ranging from about 40° C. to about 250° C., a binder, and a liquid carrier. The thermoplastic material and the binder are present in a weight ratio ranging from 100:1 to 1:1. A print medium, printing method, and printing system are also disclosed herein.

17 Claims, 1 Drawing Sheet

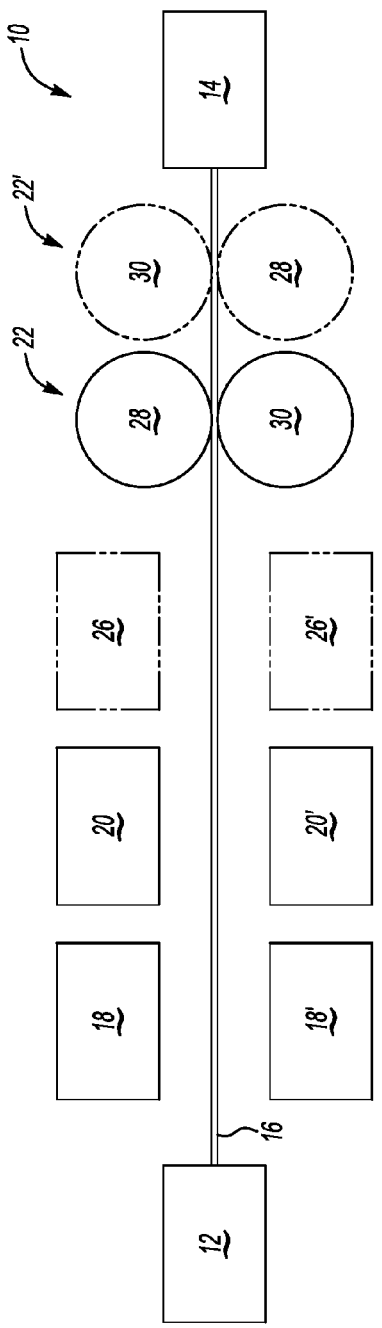
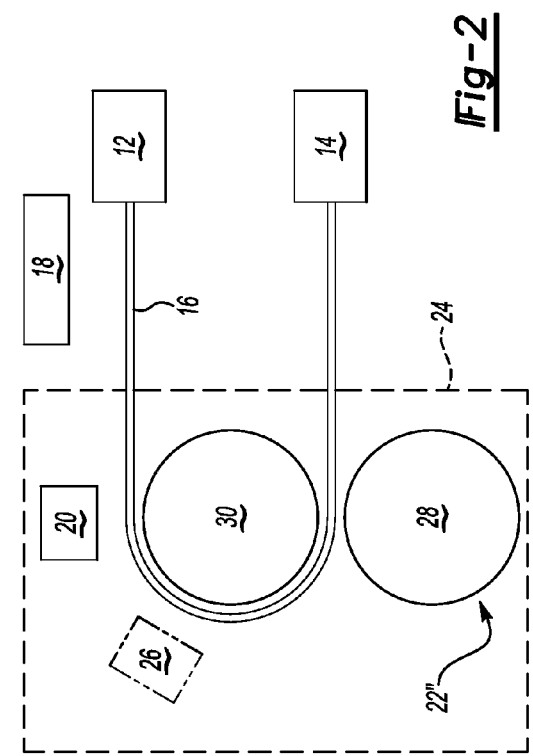

POST-TREATMENT SOLUTION FOR DIGITAL INKJET PRINTING

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a schematic illustration of an example of a printing system; and

FIG. 2 is a schematic illustration of another example of the printing system.

DETAILED DESCRIPTION

The present disclosure relates generally to a post-treatment solution for digital inkjet printing. Also disclosed herein are a printed medium, a printing method, and a printing system which include or utilize the post-treatment solution.

Examples of the post-treatment solution disclosed herein enhance a number of properties of the resulting printed media. As an example, durability and image gloss of the printed media may be improved compared, for example, to printed media that has not been treated with examples of the post-treatment solution. The post-treatment solution disclosed herein may also be applied in-line with a high-speed inkjet printing process. It is believed that the combination of the thermoplastic material and the binder in the post-treatment solution enhances the formation of a transparent film. This enables the printed media to be generated via high-speed inkjet technology while also exhibiting improved image quality (e.g., gloss, surface smoothness, gamut, etc.) and durability (e.g., rub and smear resistance). This is advantageous because current media and printing techniques may introduce obstacles that prevent achieving both high image quality and durability of the resulting print.

Referring now to FIGS. 1 and 2, examples of the printing system 10, 10' are schematically depicted. The printing systems 10, 10' are high-speed inkjet printers which can be operated at a printing speed up to 2000 feet per minute.

An example of the printing system 10 includes a media transport device (including media input 12 and media output 14), an ink applicator 18, a post-treatment applicator 20, and a fusing system 22. These components alone may be included in the system 10, and this example of the system 10 may be used for single sided printing, post-treatment application, and fusing. If the system 10 is configured as a single side treatment system, a second single side treatment system may be included to treat the other side of the medium 16. Alternatively, as shown in phantom in FIG. 1, the system 10 itself may include a second ink applicator 18', a second post-treatment applicator 20', and a second fusing system 22' so that both sides of the medium 16 may be treated in the single system 10.

In the system 10, the post-treatment applicator(s) 20, 20' and the fusing system(s) 22, 22' are in-line with the other system 10 components. While not shown, it is to be understood that the applicator(s) 20, 20' and the system(s) 22, 22' may be respective off-line systems that are separate from one another and separate from the other system 10 components.

The printing system 10' includes the media transport device (including media input 12 and media output 14), the ink applicator 18, and a combined post-treatment applicator and fusing system 24. In the system 10', the combined post-treatment applicator and fusing system 24 are in-line with the other system 10' components. While not shown, it is to be understood that the combined post-treatment applicator and fusing system 24 may also be separate from the other system 10' components.

Furthermore, it is to be understood that the system 10 may also include a dryer 26 between the post-treatment applicator 20 and the fusing system 22, and that the system 10' may include the dryer 26 as part of the combined post-treatment applicator and fusing system 24. When the system 10 is a dual-sided treatment system, the system 10 may also include the dryer 26' positioned between the second post-treatment applicator 20' and the second fusing system 22'. The dryer(s) 26, 26' may be particularly desirable when the post-treatment solution is applied at a relatively high coat weight (e.g., 15 gsm or more). In either system 10 or 10', another dryer (not shown) may also be included between the ink applicator(s) 18, 18' and the post-treatment applicator(s) 20, 20' in order to dry the deposited ink before applying the post-treatment solution.

Still further, either system 10, 10' may include a controller (not shown) having processing unit(s) that transmit(s) signals to the various system components to operate each of the components in a desirable manner to form image(s) on a medium 16. When at least some of the components are off-line, it is to be understood that various controllers may be included. Additional auxiliary equipment, such as a static control bar, a moisturizing unit, a finishing device, may also be incorporated in the printing system 10, 10' in-line or off-line to make the final print medium.

As used herein, "image" refers to marks, signs, symbols, figures, indications, and/or appearances deposited upon a material or substrate with either a visible or an invisible inkjet ink composition. Examples of an image can include characters, words, numbers, alphanumeric symbols, punctuation, text, lines, underlines, and the like.

Referring now specifically to FIG. 1, the media transport device is a mechanism that, when in operation, transports or moves one side of the medium 16 relative to and between at least the ink applicator 18, the post-treatment applicator 20, and the fusing system 22. When the system 10 is a dual-sided treatment system, the media transport device also transports or moves the other side of the medium 16 relative to and between at least the second ink applicator 18', the second post-treatment applicator 20', and the second fusing system 22'. As shown in FIG. 1, the media transport device may transport the medium 16 between the ink applicators 18 and 18', the post-treatment applicators 20 and 20', and the rollers 28, 30 of fusing systems 22 and 22' to achieve dual sided printing, post-treatment solution application, and fusing. It is to be understood that when the post-treatment applicator(s) 20, 20' and/or the fusing system(s) 22, 22' is/are an off-line system(s) (i.e., detached from the other printing system 10 components), the post-treatment applicator(s) 20, 20' and/or the fusing system(s) 22, 22' may include a separate media transport device.

The media transport device shown in FIG. 1 includes the media input 12 and the media output 14. The input 12 receives the media 16 into the system 10, the output 14 exits the media 16 from the system 10, and a transport mechanism (not shown) moves the media 16 between the input 12 and the output 14. In an example, the media transport device moves the medium 16 in the form of a web, and the media input 12 and the media output 14 include, respectively, supply and take up rolls. In another example, the media transport device moves the medium 16 in the form of individual sheets. In still another example, the media transport device initially moves the media in the form of a web, but the system 10 may convert the web into sheet form before any intermediate steps take place (e.g., before ink application) or just before exiting the system 10 (e.g., after fusing and before the medium is transported to the output 14). It is to be understood that the media transport mechanism may include rollers (e.g., steel rollers), belts, conveyors or other structures to drive and move the medium 16.

The medium 16 disclosed herein may be a cellulose base substrate (e.g., paper or board) that is coated or uncoated. The cellulose base substrate includes, in an example, pulp and filler. The pulp may be wood-free pulp, such as bleached or unbleached kraft chemical pulp and bleached or unbleached sulfite chemical pulp; wood containing pulp, such as groundwood pulp, thermomechanical pulp, and/or chemo-thermomechanical pulp; non-wood pulp (e.g., bamboo, bagasse, recycled fibers, cotton fibers, etc.), or combinations thereof. The filler may be kaolin clay, calcined clay, ground calcium carbonate, precipitated calcium carbonate, gypsum (i.e., hydrated calcium sulfate), silica, talc, zeolite, titanium oxide, or combinations thereof. In an example, the cellulose base substrate includes from about 3 wt. % to about 35 wt. % filler and a balance of pulp. In another example, the cellulose base substrate may also include other additives, such as sizing agents, alkenyl or alkylsuccinic acid anhydride emulsification products and rosin derivatives, dry strengthening agents, wet strengthening agents, retention aids, flocculants, deinking agents, surfactants, fixers, pH adjustors, biocides, and/or coloring agents. Any of these additives may be added to the base substrate or may be applied to surface(s) of the base substrate (using a surface treatment) in an amount ranging from about 0.5 wt. % to about 25 wt. %. In an example, any of the additives may be added in an amount ranging from about 1 wt. % to about 10 wt. %.

Examples of suitable internal sizing agents include metal salts of fatty acids and/or fatty acids, alkyl ketene dimer emulsification products, and/or epoxidized higher fatty acid amides. Some specific examples of metal salts include metal cations, such as potassium, sodium, calcium, magnesium, barium, strontium, and aluminum ions, and anions, such as fluoride, chloride, iodide, bromide, nitrate, chlorate, and acetate ions. Suitable synthetic surface sizing agents include acrylic emulsion products, polyurethanes, styrene acrylic solutions, styrene acrylate emulsions, ethylene acrylic acids, and styrene maleic anhydride. Various combinations and/or derivatives of metal salts may also be used. Some examples of dry strengthening agents include glyoxal, anionic, cationic or amphoteric polyacrylamides (e.g., glyoxal functionalized polyacrylamide or its copolymers), polyvinyl alcohol, amphoteric or cationized starch, casein, and vegetable galactomannan; while some examples of wet strengthening agents include dialdehyde starch and polyamine-polyamide-epichlorohydrin resins (e.g., polyamido-amine-epichlorohydrin, PEA). Water-soluble aluminum salts, aluminum chloride, and aluminum sulfate may be used as fixers, and sodium hydroxide, sodium carbonate and sulfuric acid may be used as pH adjustors. Examples of some suitable coloring agents include pigments, coloring dyes, and fluorescent brighteners.

The cellulose base substrate may also have a basis weight ranging from about 35 grams per square meter (gsm) to about 500 gsm. A heavier substrate (e.g., board grade substrates) may be selected by its thickness (as opposed to its basis weight). The thickness may range from about 7 points to about 30 points (where 1 point=1/1000 inches).

When an uncoated cellulose base substrate is selected as the medium 16, the cellulose base substrate may be subjected to a surface treatment. The surface treatment may be performed off-line before printing, or may be applied in-line as a pre-treatment before printing. For example, one or both sides of the cellulose base substrate may be exposed to a surface treatment process, where a metallic salt, a binder, a cross-linking agent, an optical brightening agent, a synthetic sizing agent, a wet and/or dry strengthening agent, and/or a dye is/are selectively applied to the surface(s).

Any of the previous examples of metal salts, synthetic sizing agents, wet strengthening agents and dry strengthening agents may be used in a surface treatment process. Examples of suitable binders include natural substances (such as starch) and/or synthetic components (such as polymeric latex and polymeric water soluble components, e.g., poly(vinyl alcohol) (PVA)). Examples of suitable optical brightening agents include azoles; biphenyls; coumarins; furans; ionic brighteners such as anionic, cationic, and nonionic (neutral) compounds; naphthalimides; pyrazenes; substituted (e.g., sulfonated) stilbenes; salts of the previously listed compounds, including alkali metal salts, alkaline earth metal salts, transition metal salts, organic salts and ammonium salts; and combinations of one or more of the foregoing agents.

As mentioned above, a coated cellulose base substrate may also be selected as the medium 16. Examples of coated cellulose base substrates include pigmented coated offset paper, solid bleached board, liner board, corrugated board, container board, and liquid package board. Other examples of coated substrates include plastic film base papers or photo base papers. Similar to the uncoated substrates, coated substrates (such as coated cellulose base substrates or coated plastic film base substrates) may also be subjected to a surface treatment prior to printing. For example, one or both sides of the coated substrate may be exposed to the surface treatment process, where the metallic salt, the binder, the cross-linking agent, the optical brightening agent, the synthetic sizing agent, the wet and/or dry strengthening agent, and/or the dye is/are selectively applied to the surface(s).

During operation, the medium 16 is moved from the media input 12 toward the media output 14 and in proximity of the ink applicator(s) 18, 18' so that ink may be dispensed onto one or both surfaces of the medium 16 from the ink applicator(s) 18, 18'.

In the system 10, it is to be understood that the ink applicator(s) 18, 18' may be a print engine that supplies one or more colors of ink to the medium 16. The ink applicator(s) 18, 18' may include a plurality of printbars that are fixed in positions to provide full color printing across the width of the medium 16 as the medium 16 is moved with respect to the printbars. In an example print engine, two printbars in tandem are configured to respectively dispense each of the colored inks. Each printbar may include a plurality of (replaceable) inkjet printheads or pens that extend the width of the medium 16. Examples of the inkjet printheads or pens may include thermal inkjet printheads or pens (which use pressure caused by bubbles formed by heating ink), acoustic inkjet printheads or pens (in which an electric signal is transformed into an acoustic beam and ink is irradiated with the acoustic beam so as to be ejected by radiation pressure), or piezoelectric inkjet printheads or pens (a drop-on-demand method which uses vibration pressure of a piezo element). The ink(s) may be stored in respective reservoirs/cartridges that are in selective fluid communication with one or more printhead(s) or pen(s).

Any inkjet ink may be contained in and dispensed from the ink applicator(s) 18, 18'. The inkjet ink(s) may be black, yellow, cyan, light cyan, magenta, light magenta, orange, red, green, or any other desirable color. In an example, the inkjet ink includes an ink vehicle and a colorant. Examples of suitable components for the ink vehicle include water soluble polymers, anionic polymers, surfactants, solvents, co-solvents, buffers, biocides, sequestering agents, viscosity modifiers, surface-active agents, chelating agents, resins, and/or water, and/or combinations thereof. The colorants may be pigments, dyes, or a combination thereof. In some instances, a colorless fixing solution may be applied (e.g., by the ink applicator(s) 18, 18') to bond the ink colorant to the medium 16. The colorless fixing solution may include any of the ink components, except for the colorant.

When the post-treatment applicator(s) 20, 20' is/are in-line, the medium 16, having ink applied to at least a portion thereof, is moved in proximity of the post-treatment applicator(s) 20, 20' so that the post-treatment solution may be applied onto all or a portion of one or both surfaces of the medium 16. The post-treatment applicator(s) 20, 20' may be running at the same speed as the ink applicator(s) 18, 18'. When the post-treatment applicator(s) 20, 20' is/are off-line, the medium 16 may be transferred to another system including the post-treatment applicator(s) 20, 20' for the application of the post-treatment solution.

Whether in-line or off-line, the post-treatment applicator(s) 20, 20' may include mechanisms and/or devices that utilize thermal inkjet printing, rod coating, dip coating, film transfer, or curtain coating to apply the post-treatment solution to the printed-on medium 16. Examples of other suitable post-treatment applicators 20, 20' include air doctor coaters, blade coaters, knife coaters, squeeze coaters, impregnation coaters, roll coaters or reverse roll coaters, transfer roll coaters, gravure coaters, kiss-roll coaters, cast coaters, spray coaters, offset coaters, flexo coaters, and extrusion coaters.

In an example, the post-treatment applicator 20 and the second post-treatment applicator 20 apply the post-treatment solution to a respective side/surface of the medium 16 in a range of about 0.1 gsm to about 20.0 gsm. In another example, the post-treatment applicator 20 and the second post-treatment applicator 20' apply the post-treatment solution to a respective side/surface of the medium 16 in a range of about 0.5 gsm to about 5.0 gsm. When two separate single side treatment systems are used in sequence, the post-treatment applicator 20 of one system may be configured to apply the desired amount of the post-treatment solution on one side and the post-treatment applicator 20 of the other system may be configured to apply the desired amount of the post-treatment solution on the other side. It is to be understood that the post-treatment applicators 20 and/or 20' may be configured to apply the post-treatment solution at other coating weights as well.

The post-treatment solution contained in the post-treatment applicator(s) 20, 20' includes a liquid carrier, a thermoplastic material, and binder. In some examples, the post-treatment solution also includes a surfactant.

The thermoplastic material in the post-treatment solution may be a single thermoplastic material or a combination of two or more thermoplastic materials. Whether used alone or in combination, the thermoplastic materials each have a melting temperature ranging from about 40° C. to about 250° C. A combination of two or more thermoplastic materials may include two or more thermoplastic materials having different molecular structures and/or two or more thermoplastic materials with the same molecular structure but different molecular weights (e.g., polyethylene wax and polyethylene solid beads). When a combination of wax and other materials are utilized, the weight ratio of wax:material may range from 100:1 to 100:50.

It is believed that the thermoplastic material(s) disclosed herein do not chemically bond with the underlying ink particles, and that the binder aids in the adhesion of the post-treatment solution to the previously applied ink and to the medium 16.

The thermoplastic material(s) may be in the form of a dispersion or an emulsion. The thermoplastic material(s) may be natural materials or polyolefin-based materials. Some thermoplastic material(s) are non-ionic, anionic, or cationic materials. As examples, the thermoplastic material(s) may be a beeswax, a carnauba wax, a candelilla wax, a montan wax, a Fischer-Tropsch wax, a polyethylene-based wax, a high density polyethylene-based wax, a polybutene-based wax, a paraffin-based wax, a polytetrafluoroethylene-based material, a polyamide-based material, a polypropylene-based wax, and combinations of any of these waxes and materials.

The following are some examples of suitable thermoplastic materials. The MICHEM® and RESISTO COAT™ products are available from Michelman, Inc., Cincinnati, Ohio, and that ULTRALUBE® products are available from KeimAdditec Surface GmbH, Kirchberg/Hunsruck. Some specific examples of the carnauba wax include an anionic carnauba wax emulsion (e.g., MICHEM® Emulsion 24414, MICHEM® Lube 160, MICHEM® Lube 160F, MICHEM® Lube 160PF, and MICHEM® Lube 160PFP) or a non-ionic carnauba wax emulsion (e.g., MICHEM® Lube 156). A specific example of the montan wax is a water based emulsion of montan based ester wax (e.g., MICHEM® Emulsion 61222). A specific example of the Fischer-Tropsch wax is a non-ionic Fischer-Tropsch wax emulsion (e.g., MICHEM® Emulsion 98040M1) or a non-ionic Fischer-Tropsch wax dispersion (e.g., MICHEM® Guard 60). Some specific examples of the polyethylene-based wax include polyethylene (e.g., MICHEM® Wax 410), an anionic polyethylene wax emulsion (e.g., MICHEM® Emulsion 52830, MICHEM® Lube 103DI, and MICHEM® Lube 190), an anionic polyethylene wax dispersion (e.g., MICHEM® Guard 7140), a non-ionic polyethylene wax dispersion (e.g., MICHEM® Guard 25, MICHEM® Guard 55, MICHEM® Guard 349, and MICHEM® Guard 1350) a non-ionic polyethylene wax emulsion (e.g., MICHEM® Emulsion 72040), or a high melt polyethylene wax dispersion (e.g., SLIP-AYD® SL 300, Elementis Specialties, Inc., Hightstown, N.J.). Some specific examples of the high density polyethylene-based wax include a high density polyethylene non-ionic wax emulsion (e.g., ULTRALUBE® E-810 and ULTRALUBE® E-846), a high density polyethylene non-ionic wax dispersion (e.g., ULTRALUBE® D-806), a high density polyethylene anionic wax dispersion (e.g., ULTRALUBE® D-803), a high density polyethylene non-ionic wax microdispersion (e.g., ULTRALUBE® MD 2000 and ULTRALUBE® MD 2100), or a high density polyethylene anionic wax microdispersion (e.g., ULTRALUBE® MD 2300/50). Some specific examples of the paraffin-based wax include a non-ionic paraffin wax emulsion (e.g., MICHEM® Lube 723 and MICHEM® Lube 743) or a solvent dispersion of paraffin wax (e.g., Wax Dispersion 40 from Michelman, Inc., Cincinnati, Ohio). An example of the polytetrafluoroethylene-based material is a non-ionic polytetrafluoroethylene dispersion (e.g., MICHEM® Glide 37) and an example of the polyamide-based material is an anionic polyamide dispersion (e.g., MICHEM® Emulsion D310). An example of the polypropylene-based wax is a polypropylene wax emulsion (e.g., ULTRALUBE® E-668 H).

Examples of suitable combination thermoplastic materials include an anionic paraffin/polyethylene wax emulsion (e.g., MICHEM® Emulsion 36840, MICHEM® Emulsion 66035, MICHEM® Lube 135, MICHEM® Lube 270R, MICHEM® Lube 368, MICHEM® Lube 511, and MICHEM® Lube 693), a non-ionic high density polyethylene/paraffin wax emulsion (e.g., MICHEM® Emulsion 91840), an anionic carnauba/polyethylene wax emulsion (e.g., MICHEM® Lube 110), an anionic co-emulsion of carnauba and paraffin waxes (e.g., MICHEM® Lube 180), an anionic carnauba/paraffin wax emulsion (e.g., MICHEM® Lube 182 and MICHEM® Lube 388F), a polyethylene/paraffin wax emulsion (e.g., ULTRALUBE® E-389), a paraffin/polyethylene wax blend (e.g., RESISTO COAT™ 39AF and RESISTO COAT™ PLUS), or a high density polyethylene/polytetrafluoroethylene non-ionic wax dispersion (e.g., Ultralube® D-838).

As other examples, the thermoplastic material(s) may be an anionic paraffin/ethylene acrylic acid wax emulsion (e.g., MICHEM® Emulsion 34935), a cationic water based emulsion of polyolefin waxes (e.g., MICHEM® Emulsion 42035A), anionic microcrystalline wax emulsions (e.g., MICHEM® Lube 124 and MICHEM® Lube 124H), or a high density polyethylene/copolymer non-ionic wax emulsion (e.g., ULTRALUBE® E-530V).

The post-treatment solution also includes a binder. Example binders include poly(vinyl alcohol) (PVA), polyethylene-co-polyvinyl alcohol, cationic poly(vinyl alcohol), poly(vinyl alcohol) with acetoacetyl functional groups, poly(vinyl alcohol) with silanol functional groups, anionic poly(vinyl alcohol), polyvinylpyrrolidone polymers, polyvinylpyrrolidone copolymers, polyethylene oxide, polyethylene oxide copolymers, polypropylene oxide, polypropylene oxide copolymers, polyacrylic polymers, polyacrylic copolymers, poly(vinyl acetate), raw starches, chemically modified starches, phenolic-based resins, polyester-based resins, polyurethanes, amino-based resins, epoxy-based resins, polyaramides, polybenzimidazole, polyoxadiazole, polypyromellitimide, or combinations thereof.

Some specific examples of poly(vinyl alcohol) include MOWIOL® 4-98, 15-79, and 40-88, which are available from Kuraray Europe GMBH Corp., Frankfurt, Germany). Some specific examples of cationic poly(vinyl alcohol) include POVAL® CM-318 and POVAL® C-506, and some specific examples of anionic poly(vinyl alcohol) include POVAL® KL-318 and POVAL® KL-506, all of which are available from Kuraray. An example of poly(vinyl alcohol) with silanol functional groups is POVAL® R-1130, available from Kuraray. A suitable poly(vinyl acetate) includes CELVOLIT™ DM, available from Celanese Emulsions GmbH, Germany). Examples of suitable phenolic-based resins include BKS 2640, BKS 2600, and BLS 2700, all of which are available from Georgia-Pacific Chemical Division, Atlanta, Ga. Examples of suitable polyester-based resins are available from The Seydel Companies, Inc., Pendergrass, Ga., and include SEYCOFILM™ PE-350, which is a sulfonated dispersion of a polyester copolymer, and SEYCOFILM™ PE-230, which is a polyester resin. Some suitable polyurethanes are available under the name SYNTEGRA™ polyurethane dispersions from The Dow Chemical Co., Midland, Mich. Suitable amino-based resins include LUWIPAL® 063 and LUWIPAL® 068, both of which are available from BASF Corp., Florham Park, N.J. Example epoxy-based resins include D.E.R. 321 liquid epoxy resin from The Dow Chemical Co. and LAROMER® LR 8765 aliphatic epoxy acrylate resins from BASF Corp.

The amount of binder present in the post-treatment solution may be dependent upon the amount of the thermoplastic material that is included. For example, a weight ratio of the thermoplastic material to the binder ranges from about 100:1 to about 1:1. As such, in some examples, up to 100 times more (based on weight) of the thermoplastic material may be used than the binder. In other examples, the same weight percent of the thermoplastic material and binder may be used. As an example, the weight ratio of the thermoplastic material to the binder ranges from about 20:1 to about 10:1.

It is believed that the combination of the thermoplastic material(s) and the binder(s) and the ratio in which these materials are present provide good cohesion and adhesion to the medium 16 and form a protective film over the ink layer.

The liquid carrier generally makes up a balance of the post-treatment solution so that the final solution has a solids content that is up to 75%. The liquid carrier may be any aqueous liquid carrier and/or any organic liquid carrier. In an example the liquid carrier is water. Examples of organic liquid carriers include n-butanol, isobutanol, propylene glycol monomethyl ethyl propionate (PGMEP), heptanes, cyclopentane, and cyclohexane.

In some examples, the post-treatment solution includes the thermoplastic material(s), the binder(s), and the liquid carrier. In these examples, no other components are added to the post-treatment solution. In other examples, the post-treatment solution includes the thermoplastic material(s), the binder(s), a surfactant, and a balance of the liquid carrier.

When a surfactant is included in the post-treatment solution, the surfactant is present in an amount ranging from about 0.01 wt. % to about 5.0 wt. % of the total wt. % of the solution. In an example, the post-treatment solution includes about 0.5 wt. % surfactant. The surfactant may be anionic, cationic, or nonionic.

Suitable anionic surfactants that may be used in the post-treatment solution include dodecyl sulfate and lauryl sulfate in the form of a sodium salt (e.g., sodium laureth sulfate), ammonium salt, or ethanolamine salt; hydroxy alkane sulfonate; and 2-bis(ethyl-hexyl) sodium sulfosuccinate.

Suitable cationic surfactants that may be used in the post-treatment solution include long chain amines and/or their salts, acrylated diamines, polyamines and/or their salts, quaternary ammonium salts, polyoxyethylenated long-chain amines, quaternized polyoxyethylenated long-chain amines, and/or combinations thereof.

Suitable nonionic surfactants include nonionic fluorosurfactants, nonionic acetylenic diol surfactants, nonionic ethoxylated alcohol surfactants and combinations thereof. Several commercially available nonionic surfactants may be used in the formulation of the treatment solution, examples of which include ethoxylated alcohols such as those from the TERGITOL® series (e.g., TERGITOL® 15S30 or TERGITOL® 15S9, manufactured by Dow Chemical); surfactants from the SURFYNOL® series (e.g. SURFYNOL® 440 and SURFYNOL® 465, manufactured by Air Products Co); fluorinated surfactants, such as those from the ZONYL® family (e.g., ZONYL® FSO and ZONYL® FSN, manufactured by E.I. DuPont de Nemours); fluorinated POLYFOX® nonionic surfactants (e.g., PF159 nonionic surfactants), manufactured by Omnova, or combinations thereof. Other nonionic surfactants, such as acetylene glycol-based surfactants and/or polyether denatured siloxane surfactants, may also be used. Examples of acetylene glycol-based surfactants include 2,4,7,9-tetramethyl-5-decyne-4,7-diol; 3,6-dimethyl-4-octyne-3,6-diol; and 3,5-dimethyl-1-hexyne-3-ol. Commercially available acetylene glycol-based surfactants include SURFYNOL® 104, 82, 465, 485, and TG, and OLFIN® STG and OLFIN® E1010 manufactured by Nissin Chemical Industry Co. Examples of polyether denatured siloxane-based surfactants include BYK-345®, BYK-346®, BYK-347®, BYK-348®, and UV3530® of Byk Co.

After both the inkjet ink and the post-treatment solution are applied to at least a portion of the medium 16, the medium 16 is a printed-on medium that may be exposed to a fusing process in order to create the final printed medium. The fusing process generally involves the application of heat and pressure to the printed-on medium.

Prior to the fusing process, the printed-on medium 16 may be exposed to a drying process using in-line or off-line dryer(s) 26, 26'. Any suitable dryer 26, 26' may be used, and examples include those that are capable of applying heat, conduction, convection, radiation, microwaves, vacuum assisted drying, or other drying mechanisms. In an example, the dryer 26, 26' is a forced air convective dryer or an infrared (IR) heater. In another example, the dryer 26, 26' includes the forced air convective dryer and one or more auxiliary infrared emitters. In yet another example, the dryer 26 is used without dryer 26', and this example of the dryer 26 includes a hybrid system of infrared heat and air convection. In this example, infrared emitters heat the air and the printed-on medium 16. The heated air dries both sides/surfaces of the medium 16 and also provides a cushion pad to float the medium 16 through the dryer 26. A fan supplies the air and an automated damper regulates the air flow in the dryer zone to maintain the set temperature.

As shown in FIG. 1, the fusing system(s) 22, 22' is/are in-line with the other components of the system 10. During operation of the system 10 when the fusing system 22 is in-line, the printed-on medium 16 is moved (by the media transport system) to the fusing system 22 after the post-treatment solution is applied thereon. During operation of the system 10 when the fusing systems 22 and 22' are in-line, the printed-on medium 16 is moved (by the media transport system) to the fusing system 22 and then the fusing system 22' after the post-treatment solution is applied to respective sides/surfaces of the medium 16. It is to be understood that when the fusing system(s) 22, 22' is/are off-line, the printed-on medium 16 may be transferred to the separate fusing system(s) 22, 22', which may include its own media transport system (e.g., turning motor) to move the printed-on medium 16.

Whether in-line or off-line, the fusing system(s) 22, 22' may include mechanisms and/or devices that expose the printed-on medium 16 (having ink and post-treatment solution applied thereon) to sufficient heat and pressure to form a protective layer/film on the medium 16. Heat and pressure from the fusing system(s) 22, 22' enable the protective layer/film to firmly bind to the medium 16. The fusing process enables the thermoplastic material to soften up, which renders them readily able to form the film under pressure. After fusing, the components in the post-treatment solution are fixed on the image surface and the medium surface.

In an example, the fusing system(s) 22, 22' includes a roller assembly having at least two rollers, namely a heated glossing roller 28 and a pressure roller 30. In both systems 22, 22', the printed-on medium 16 is exposed to both heat and pressure as it is transported between the heated glossing roller 28 and the pressure roller 30. The side of the printed-on medium 16 that has the ink and post-treatment solution applied thereto is positioned adjacent to the heated glossing roller 28 during the fusing process. When dual-sided printing and post-treatment application is performed, the system 22 is used to fuse one side/surface of the printed-on medium 16 and the system 22' is used to fuse the other side/surface of the printed-on medium 16. Temperature and pressure control units may be respectively operatively connected to the heated glossing roller(s) 28 and the pressure roller(s) 30 to obtain a suitable temperature and pressure.

The heated glossing roller(s) 28 may any single-layer roller or multi-layer roller that is capable of being heated to a desirable fusing temperature, and that is capable of heating the side/surface of the printed-on medium 16 adjacent thereto. The surface temperature of the glossing roller(s) 28 may depend upon the thermoplastic material(s) that is/are used. The fusing temperature should be selected so that it is sufficient to fuse any thermoplastic material to the medium that is utilized. In an example, the surface temperature of the glossing roller(s) 28 ranges from about 25° C. to about 250° C.

In an example, the heated glossing roller(s) 28 includes an infrared heated steel roll, or a thermally conductive ceramic core, or a thermally conductive silicone core, all of which regulate the heat flow to the printed-on medium 16. The thermally conductive ceramic or silicone core may include an outer coating which enables heat transfer but also provides a releasing property so that the final printed medium does not adhere to the heated glossing roller(s) 28. In an example, this outer coating may contain polytetrafluoroethylene (PTFE). An example of a heated glossing roller 28 including a silicone core and a PTFE coating is available from Minco Manufacturing Inc.

As shown in FIG. 1, within the fusing system 22 or 22', the pressure roller 30 is positioned across from the heated glossing roller 28 and the printed-on medium 16 is directed between the rollers 28, 30. The pressure roller(s) 30 may be adjusted to alter the gap between the rollers 28, 30 so that a suitable pressure is supplied to the printed-on medium 16. In an example, the pressure that is applied ranges from about 100 PLI to about 1500 PLI. The pressure roller(s) 30 may be made of a fluoroelastomer, such as copolymers of vinylidene fluoride, hexafluoropropylene, and tetrafluoroethylene. These materials may also be suitable coating materials on a core roller (e.g., a metal or a ceramic roller). Other synthetic rubber materials may be used as the pressure roller(s) 30 or as a coating on the core roller of the pressure roller(s) 30. The coated silicone roller described for the roller(s) 28 may also be used for the roller(s) 30, although not for the purpose of providing heat.

The rollers 28, 30 may be operated so that the line speed of the printed-on medium 16 ranges from about 5 feet per minute up to about 2000 feet per minute. If fusing is performed off-line or near-line from printing and post-treatment solution application, then the rollers 28, 30 may be operated at higher line speeds.

Examples of other suitable fusing systems 22, 22' include laser fusing systems.

Referring now to FIG. 2, an example of the system 10' including the combined post-treatment applicator and fusing system 24 is depicted. The previous description of the post-treatment solution and any components of the system 10 that are part of the system 10' will not be repeated, and it is to be understood that this description is applicable for the system 10' shown in FIG. 2.

In the example shown in FIG. 2, the media transport device transports or moves the medium 16 relative to and between the ink applicator 18 and the combined post-treatment applicator and fusing system 24. It is to be understood that when the combined post-treatment applicator and fusing system 24 is/are an off-line system (i.e., detached from the ink applicator 18), the combined post-treatment applicator and fusing system 24 may include a separate media transport device.

The media transport device shown in FIG. 2 includes the media input 12 and the media output 14. In this example, the media transport device transports the medium 16 from the media input 12 toward the media output 14 and in proximity of the ink applicator 18 so that ink may be dispensed onto the medium 16 from the ink applicator 18. A dryer may be positioned between the ink applicator 18 and the combined post-treatment applicator and fusing system 24 in order to dry the ink before post-treatment solution application.

The media transport device then moves the medium 16 to the combined post-treatment applicator and fusing system 24 for application of the post-treatment solution and exposure to the fusing process. The combined system 24 includes the post-treatment solution applicator 20 and a modified version of the fusing system 22'.

The modified version of the fusing system 22" includes the roller assembly having the pressure roller 30 and the heated glossing roller 28. In this example, the rollers 30, 28 are positioned across from one another, but the pressure roller 30 operates to first move the medium 16 (having ink printed therein) in proximity of the post-treatment solution applicator 20. As illustrated in FIG. 2, the pressure roller 30 receives the medium 16 after ink has been printed thereon. The pressure roller 30 guides the medium 16 in proximity of the post-treatment solution applicator 20 where the post-treatment solution is applied to at least a portion of the medium 16. The pressure roller 30 continues to rotate and thus guides the printed-on medium 16 between the rollers 30, 28 so that the side of the printed-on medium having ink and post-treatment solution thereon is adjacent to the heated glossing roller 28. When between the two rollers 30, 28, the printed-on medium 16 is exposed to both heat and pressure as discussed in reference to FIG. 1.

It is believed that the post-treatment solution disclosed herein, when exposed to the fusing process, generates the continuous, transparent film (i.e., the protective film) which has improved durability and surface gloss compared to an untreated printed image. The gloss level of the continuous, transparent film depends, at least in part, on the chemical structure of thermoplastic materials(s), the surface morphology and release capability of the rollers, the fusing temperature, pressure, moisture, and speed, the properties of the medium 16 (such as caliper, surface smoothness, and coating chemistry), or combinations thereof.

The resulting film also serves as a protective coating that protects the previously applied colorants so that the colorants are not easily removed by external forces, such as rubbing or wet smudge. The resulting film also has a moisture content ranging from about 0.5% to about 10%.

To further illustrate the present disclosure, an example is given herein. It is to be understood that this example is provided for illustrative purposes and is not to be construed as limiting the scope of the present disclosure.

EXAMPLE

Post-treatment solutions (PTS1-PTS 5) were prepared using the formulations shown in Table 1. A balance of water was added to each of the samples shown in Table 1 so that the solids content ranged from 8 wt. % to 11 wt. %. The solids content of the final samples is shown in Table 2.

TABLE 1

Post-Treatment Solution Formulations

| Chemical Components | PTS 1 | PTS 2 | PTS 3 | PTS 4 | PTS 5 |
|---|---|---|---|---|---|
| anionic polyethylene wax emulsion (MICHEM ®Lube 190) | 100 | 0 | 0 | 0 | 0 |
| polypropylene based thermoplastic material (MICHEM ® Emulsion 59740) | 0 | 100 | 100 | 0 | 0 |
| high density polyethylene non-ionic wax microdispersion (ULTRALUBE ® MD 2100) | 0 | 0 | 0 | 100 | 0 |
| high melt polyethylene wax dispersion (SLIP-AYD ® SL 300) | 0 | 0 | 0 | 0 | 100 |
| Poly(vinyl alcohol) binder (MOWIOL ® 40-88) | 10 | 5 | 10 | 5 | 10 |
| Total Parts | 110 | 105 | 110 | 105 | 110 |

TABLE 2

Fluid Properties of Post-Treatment Solutions

| Property | PTS1 | PTS2 | PTS3 | PTS4 | PTS5 |
|---|---|---|---|---|---|
| Solids (wt. %) | 9.95 | 10.41 | 10.15 | 9.64 | 8.36 |
| pH | 8.97 | 9.39 | 9.33 | 8.51 | 4.62 |
| pH temp (° C.) | 23.4 | 22.8 | 22.9 | 22.9 | 22.9 |
| Viscosity (cp), 100 rpm | 890.2 | 6.0 | 7.92 | 5.76 | 8.22 |
| Zeta potential (mv) | −17.1 | −40.0 | −26.4 | −27.8 | −0.791 |
| Density (g/mL) | 0.807 | 0.964 | 0.975 | 0.964 | 0.977 |

A comparative sample was prepared including printed images on a medium that did not have any post-treatment solution applied thereto. The medium was commercially available 70#T Utopia Dull Inkjet coated paper (Appleton Coated, Combined Locks, Wis.), and the images for the comparative sample were printed using an HP CM8060 MFP (with HP Edgeline technology and HP A50 inks). The comparative sample was not exposed to a post-treatment solution coating process, a post-overcoat calendering process, or a high temperature treatment process.

Samples (SA-SF) were prepared by printing images on a medium (70#T Utopia Dull Inkjet coated paper) using an HP Edgeline Printer and HP A50 inks. The printed images for the comparative sample and for samples SA-SF were black and red printed images. Samples SA-SF were coated, using a Mayer rod, with about 1.0 gsm of the respective post-treatment solutions. The samples SA-SF were dried using a heatgun and then exposed to post-overcoat calendering. The calendering conditions to which each sample was exposed are shown in Table 3. Calendering applied pressure and low temperature heating. Some of the samples, namely samples SC-SF, were also exposed to a high temperature treatment using an HP color laser printer 4700 in heavy gloss mode. This simulated the fusing apparatus disclosed herein.

All of the samples (samples SA-SF and the comparative sample) were tested for image quality (L*min, gamut, black optical density (KOD), and gloss) and durability (i.e., wet smudge and dry rub).

The image quality tests included evaluation of standard optical density (OD), and color gamut tests for ink colors of black, magenta, yellow and cyan using each of the above-mentioned inkjet printers and inks. Black point (L*min) and black optical density (KOD) were measured using a transmission/reflection densitometer, supplied by X-rite, Grand Rapids, Mich. The color gamut volume was calculated based on X-Rite transmission/reflection densitometer measurements of L*, a*, and b* from 8 color patches (100% cyan, 100% magenta, 100% yellow, 100% red, 100% green, 100% blue, 100% black, and white unprinted area). Gloss was measured using a micro-gloss at 75 degree glossy meter from BYK Gardner.

In general, a higher number of gamut and KOD is desirable and a lower number for L*min is desirable. As illustrated in Table 3, Samples SA-SD generally exhibited better image quality results than the comparative example while Samples SE and SF exhibited similar or slightly worse (but acceptable) image quality results than the comparative example.

To test the durability of the samples, both dry rub testing and wet (water) smudge testing were performed. The dry rub test was performed using the solid red color printed images for each of Samples SA-SF and the comparative example. The dry rub test was performed using a Taber tester having an eraser tip and a 250 g weight. The eraser tip was cleaned with sandpaper for 3 cycles before performing the dry rub test. The eraser tip was rubbed 1 time (back and forth) on the solid red color printed images of each of Samples SA-SF and the comparative example. The Samples were visually ranked from 1 to 5, with 5 being the best (i.e., least amount of scratch).

The wet (water) smudge test was performed by pouring 50 µL of water on each of the black color printed images. After 30 seconds, the print area was smudged back and forth 5 times with 0.25 lbs weight using a cotton cloth mounted on the top of a Sutherland rub tester. Samples SA-SF were visually ranked from 1 to 5, with 5 being the best (i.e., least amount of smudging). As illustrated in Table 3, all of the samples including the post-treatment solution exhibited improved wet smudge and dry rub performance in comparison to the comparative sample, which did not include any of the post-treatment solutions.

It is to be understood that the ranges provided herein include the stated range and any value or sub-range within the stated range. For example, a range from about 0.5 wt. % to about 25 wt. % should be interpreted to include not only the explicitly recited limits of about 0.5 wt. % to about 25 wt. %, but also to include individual values, such as 0.75 wt. %, 8 wt. %, 13.5 wt. %, 22 wt. % etc., and sub-ranges, such as from about 1 wt. % to about 20 wt. %, from 5 wt. % to about 15 wt. %, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A post-treatment solution for digital inkjet printing, the post-treatment solution consisting of:
 a thermoplastic material having a melting temperature ranging from about 40° C. to about 250° C., the thermoplastic material being selected from the group consisting of a beeswax, a carnauba wax, a candelilla wax, a montan wax, a Fischer-Tropsch wax, a polyethylene-based wax, a high density polyethylene-based wax, a polybutene-based wax, a paraffin-based wax, a polytetrafluoroethylene-based material, a polypropylene-based wax, and combinations thereof;
 a binder;
 a liquid carrier; and
 optionally a surfactant;
 the thermoplastic material and the binder being present in a weight ratio ranging from 20:1 to 10:1.

2. The post-treatment solution as defined in claim 1 wherein the thermoplastic material is in the form of a dispersion or an emulsion.

TABLE 3

Results

| Sample | PTS | Calender Cond. | High Temp Treat | Gamut | L*min | KOD | Black Gloss | Visual Ranking Wet Smudge | Dry Rub |
|---|---|---|---|---|---|---|---|---|---|
| SA | 3 | RT*, 747 PLI, 1 pass | No | 249594 | 16.4 | 1.67 | 25.8 | 4 | 3 |
| SB | 2 | 150° F., 747 PLI, 1 pass | No | 239651 | 17.3 | 1.64 | 21.0 | 3.5 | 3 |
| SC | 1 | RT*, 747 PLI, 1 pass | Yes | 208918 | 20.8 | 1.50 | 27.2 | 3 | 3.5 |
| SD | 2 | RT*, 747 PLI, 1 pass | Yes | 253542 | 15.3 | 1.68 | 34.3 | 4 | 3 |
| SE | 4 | RT*, 747 PLI, 1 pass | Yes | 195102 | 30.6 | 1.02 | 25.5 | 3.5 | 4 |
| SF | 5 | RT*, 747 PLI, 1 pass | Yes | 192317 | 23.3 | 1.41 | 18.5 | 3 | 4 |
| Comp. | none | none | No | 236669 | 21.3 | 1.48 | 25.0 | 2 | 2 |

*RT = room temperature of 75° F. (no heating of the rolls)

3. The post-treatment solution as defined in claim 1 wherein the thermoplastic material is a non-ionic material, an anionic material, or a cationic material.

4. The post-treatment solution as defined in claim 1 wherein:
the carnauba wax is an anionic carnauba wax emulsion or a non-ionic carnauba wax emulsion;
the Fischer-Tropsch wax is a non-ionic Fischer-Tropsch wax emulsion or a non-ionic wax dispersion;
the polyethylene-based wax is polyethylene, an anionic polyethylene wax emulsion, an anionic polyethylene wax dispersion, a non-ionic polyethylene wax emulsion, a non-ionic polyethylene wax dispersion, or a high melt polyethylene wax dispersion;
the high density polyethylene-based wax is a high density polyethylene non-ionic wax emulsion, a high density polyethylene non-ionic wax dispersion, a high density polyethylene anionic wax dispersion, a high density polyethylene non-ionic wax microdispersion, or a high density polyethylene anionic wax microdispersion;
the paraffin-based wax is a non-ionic paraffin wax emulsion or a solvent dispersion of paraffin wax;
the polytetrafluoroethylene-based material is a non-ionic polytetrafluoroethylene dispersion;
the polypropylene-based wax is a polypropylene wax emulsion; or
the combination of thermoplastic materials is an anionic paraffin/polyethylene wax emulsion, a non-ionic high density polyethylene/paraffin wax emulsion, an anionic carnauba/polyethylene wax emulsion, an anionic co-emulsion of carnauba and paraffin waxes, an anionic carnauba/paraffin wax emulsion, a polyethylene/paraffin wax emulsion, a paraffin/polyethylene wax blend, or a high density polyethylene/polytetrafluoroethylene non-ionic wax dispersion.

5. The post-treatment solution as defined in claim 1 wherein the liquid carrier is a balance of the solution so that a solids content of the post-treatment solution is up to 75 wt. %.

6. The post-treatment solution as defined in claim 1 wherein the binder is poly(vinyl alcohol), polyethylene-co-polyvinyl alcohol, cationic poly(vinyl alcohol), poly(vinyl alcohol) with acetoacetyl functional groups, poly(vinyl alcohol) with silanol functional groups, anionic poly(vinyl alcohol), polyvinylpyrrolidone polymers, polyvinylpyrrolidone copolymers, polyethylene oxide, polyethylene oxide copolymers, polypropylene oxide, polypropylene oxide copolymers, polyacrylic polymers, polyacrylic copolymers, poly (vinyl acetate), raw starches, chemically modified starches, phenolic-based resins, polyester-based resins, polyurethanes, amino-based resins, epoxy-based resins, polyaramides, polybenzimidazole, polyoxadiazole, polypyromellitimide, or combinations thereof.

7. A printing method, comprising:
applying an inkjet ink on a medium;
applying the post-treatment solution as defined in claim 1 on at least a portion of the medium after the inkjet ink is applied thereon, thereby forming a printed-on medium; and
exposing the printed-on medium to a fusing process to form a transparent film.

8. The printing method as defined in claim 7, further comprising:
controlling a surface temperature of a roller used in the fusing process so that the surface temperature ranges from about 25° C. to about 250° C.;
controlling a pressure applied to the printed-on medium during the fusing process so that the pressure ranges from about 100 PLI to about 1500 PLI; and
controlling a speed of the printing method so that the speed ranges from about 5 feet/minute to about 2000 feet/minute.

9. The printing method as defined in claim 7, further comprising exposing the printed-on medium to drying before performing the exposing step.

10. A print medium, comprising:
a substrate;
an inkjet ink applied to at least a portion of the substrate; and
the post-treatment solution as defined in claim 1 applied to the substrate to form a transparent film on the substrate.

11. The print medium as defined in claim 10, further comprising the transparent film after the applied post-treatment solution has been exposed to a fusing process.

12. The print medium as defined in claim 10 wherein from about 0.1 gsm to about 20.0 gsm of the post-treatment solution is applied to the substrate.

13. The post-treatment solution as defined in claim 1 wherein the liquid carrier is a balance of the solution so that a solids content of the post-treatment solution ranges from 8 wt. % to 11 wt. %.

14. The post-treatment solution as defined in claim 13 wherein the binder is poly(vinyl alcohol);
and wherein the thermoplastic material is selected from the group consisting of an anionic polyethylene wax emulsion, a high melt polyethylene wax dispersion, a high density polyethylene non-ionic wax microdispersion, and a polypropylene wax emulsion.

15. The post-treatment solution as defined in claim 1 wherein the thermoplastic material is a combination of thermoplastic materials, the combination being selected from the group consisting of an anionic paraffin/polyethylene wax emulsion, a non-ionic high density polyethylene/paraffin wax emulsion, an anionic carnauba/polyethylene wax emulsion, an anionic co-emulsion of carnauba and paraffin waxes, an anionic carnauba/paraffin wax emulsion, a polyethylene/paraffin wax emulsion, a paraffin/polyethylene wax blend, and a high density polyethylene/polytetrafluoroethylene non-ionic wax dispersion.

16. The post-treatment solution as defined in claim 1 wherein the thermoplastic material has a melting temperature ranging from about 40° C. to about 120° C.

17. The post-treatment solution as defined in claim 1 wherein:
the thermoplastic material is an anionic polyethylene wax emulsion, the binder is poly(vinyl alcohol), and the thermoplastic material and the binder are present in a weight ratio of 10:1; or
the thermoplastic material is polypropylene based, the binder is poly(vinyl alcohol), and the thermoplastic material and the binder are present in a weight ratio of 20:1; or
the thermoplastic material is a high density polyethylene non-ionic wax microdispersion, the binder is poly(vinyl alcohol), and the thermoplastic material and the binder are present in a weight ratio of 10:1; or
the thermoplastic material is a high melt polyethylene wax dispersion, the binder is poly(vinyl alcohol), and the thermoplastic material and the binder are present in a weight ratio of 20:1.

* * * * *